United States Patent [19]

Connolly et al.

[11] Patent Number: 5,120,693
[45] Date of Patent: Jun. 9, 1992

[54] BONDED ADSORBENT AGGLOMERATES

[75] Inventors: Philip Connolly, Danbury, Conn.; Frank G. Portenstein, Ossining, N.Y.

[73] Assignee: UOP, Des Plaines, Ill.

[21] Appl. No.: 674,639

[22] Filed: Mar. 25, 1991

[51] Int. Cl.$^5$ .............................................. B01J 20/18
[52] U.S. Cl. ..................................................... 502/64
[58] Field of Search ................................... 502/60, 64

[56] References Cited

U.S. PATENT DOCUMENTS

| | | | |
|---|---|---|---|
| 3,411,888 | 11/1968 | Westerland et al. | 502/60 |
| 3,624,003 | 11/1971 | Conde et al. | 502/64 |

FOREIGN PATENT DOCUMENTS

| | | | |
|---|---|---|---|
| 273736 | 7/1988 | European Pat. Off. | 502/64 |
| 8808329 | 11/1988 | World Int. Prop. O. | 502/64 |

Primary Examiner—Carl F. Dees
Attorney, Agent, or Firm—Thomas K. McBride; Richard G. Miller

[57] ABSTRACT

Agglomerates of zeolitic molecular sieves which are bonded with particles of generally spherical amorphous colloidal-sized silica particles having nominal diameters in the range of 40 to 800 nanometers are found to have increased adsorption capacity for many molecular species due to the development in the binder of a pore system created by the packing of the silica spheres. When the molecular sieves employed are highly siliceous and hydrophobic, the agglomerates are ideally suited for use in odor elimination applications in which unagglomerated molecular sieve particles create dusting and handling problems.

9 Claims, 2 Drawing Sheets

BONDED ADSORBENT AGGLOMERATES

FIELD OF THE INVENTION

The present invention relates in general to bonded agglomerates of crystalline zeolite particles, and more particularly to silica-bonded spray dried agglomerates of molecular sieves, especially high-silica hydrophobic zeolitic molecular sieve particles suitable for use in the elimination of odors.

BACKGROUND OF THE INVENTION

The suppression or elimination of odors, particularly undesirable odors, has been the objective of untold investigations over the period of many centuries. In general these investigations have been focused on either of two approaches, namely (a) odor masking, in which a substance of strong yet relatively pleasant odor is introduced into the proximity of a less pleasant odor source with the intent of overburdening the olfactory receptors with the dominant pleasant odor, or (b) sequestering the undesired odorous substance in a nonvolatile form either by chemical reaction, adsorption or absorption on a sorbent material exhibiting a sorptive preference for the odorous substance.

With respect to the latter approach, a very significant advance has been described in detail in U.S. Pat. No. 4,795,482, Gioffre et al, the entire disclosure of which is incorporated by reference herein. The discovery which is the basis for this advance is that a particular subclass of crystalline zeolitic molecular, i.e., those in which at least 90 percent of the framework tetrahedral oxide units are $SiO_2$ tetrahedra and have a sorptive capacity for water, at 25° C. and 4.6 torr, of less than 10 weight percent, possess a remarkable capability to sequester vapor phase molecules of odorous organic materials. In some instances, the zeolitic materials are found to render odorless vapors phases in which concentrations of the odor-causing composition must be reduced to levels below 0.00000004 mg./liter, the threshold concentration for detection by the normal human olfactory system. It is apparent that much more than mere organophilic adsorptive selectivity is involved. Although the phenomenon is not fully understood at present, one theory is that a catalytic process is involved whereby the odor molecules are reacted inter se or with other available molecular species, such as oxygen, to form compounds or polymers which no longer stimulate the olfactory receptors. It is known that high molecular weight organic molecules are significantly less odorous than low molecular weight molecules of similar atomic content and structure, n-decyl and lauryl mercaptans have no more odor than their corresponding alcohols. Thus, polymerization or condensation reactions could be beneficial in the present process. It is another possibility that the adsorption isotherms for the odor molecules for the very highly siliceous zeolite adsorbents involved here have steeper slopes in the region of very low adsorbate partial pressures than has heretofore been appreciated. Since the partial pressures of odor molecules often encountered are frequently quite low, the high silica adsorbents would exhibit superior adsorptive performance for that reason. Still another factor may be van der Waals interactions between the odor molecules and the molecular sieve causing the odor molecules to be tightly bound and trapped within the adsorbent. There may also be a coadsorption of two or more different odor molecules resulting in a synergism that eliminates the odors of both.

The crystalline zeolitic adsorbents, to be effective in the elimination or suppression of odors, must in most instances be applied topically to the odor source. Such topical application can involve the use of powders, aerosol sprays, lotion formulations and the like. For these procedures the powderous nature of the very small crystallite forms in which zeolitic compositions are conventionally synthesized is ideally suited since further size reduction by grinding will ordinarily not be required. There are, however, a considerable number of applications for which powders are not completely satisfactory. For example, it has been proposed to utilize the deodorizing properties of high-silica molecular sieves in a variety of fibrous absorbent articles such as diapers, catamenial devices, wound dressings, incontinence pads, and shoe inserts. These articles are disclosed in detail in U.S. Pat. No. 4,826,497 (Marcus et al). It is important that the molecular sieves be incorporated into these articles in a manner whereby they not only remain in a dispersed condition throughout the fibrous area to which they are initially imparted, but also that their deodorizing properties are not unduly diminished as a consequence of the means used to prevent their dislocation. It is virtually impossible to prevent powdered solids such as molecular sieve crystallites from separating from fibrous batting without the use of some type of adhesive adjunct. Such adhesives necessarily cover at least a portion of the surface of the adsorbent particles and thereby tend to decrease their deodorizing capacity.

Another disadvantage of powders in general and molecular sieve powders in particular is the difficulty involved in the handling and dispensing operations carried out by the automated production apparatus used almost universally in the commercial scale manufacturing of articles which contain the powders. In addition to having the potential for creating harmful dust contamination of the air in the production area, the powders are difficult to transport and meter accurately and cause abrasive damage to machine parts in contact with the moving powder particles.

THE DRAWINGS

FIG. 1 of the drawings is a schematic flow diagram showing a procedure suitably employed in the practice of the present invention.

FIG. 2 is a plot showing the experimentally obtained oxygen adsorption capacity of silica-bonded agglomerates of this invention with increasing molecular sieve content, and also showing the oxygen capacity attributable to the molecular sieve content alone.

SUMMARY OF THE INVENTION

It has now been found that zeolitic molecular sieve agglomerates, preferably highly siliceous molecular sieve agglomerates, having nominal diameters within the range of about 40 to 800 micrometers, preferably from 100 to 600 micrometers, which are bonded with a bonding agent consisting essentially of amorphous silica particles having nominal silica particle diameters of from about 5 to 20 nanometers are readily incorporated into fibrous articles, are firmly retained within the fibrous article during packaging, transport and use thereof, and, in addition, exhibit increased effectiveness in sequestering at least some of the common constituents of unpleasant odors. On an anhydrous basis, the silica binder constitutes from about 10 to 20 weight percent, the crystalline molecular sieve adsorbent constitutes from about 50 to 90 weight percent and the optionally present constituents such as fillers, pigments, lubricants, and agents used to increase the hydrophobicity of the silica binder, and the like, can comprise from zero to about 40 percent of the weight of the overall agglomerate. Configuration, i.e., shape, of the agglomerates is not a critical factor, but it is preferred that the agglomerates have curved outer surfaces with a minimum of sharp edges and corners which tend to increase agglomerate attrition. Spherical or spheroidal shapes are much preferred configurations, and such shapes most frequently result from the manufacturing procedure. The preferred method of manufacture, spray drying, readily produces essentially spherical mini-beads.

DETAILED DESCRIPTION OF THE DRAWINGS

Figure 1:
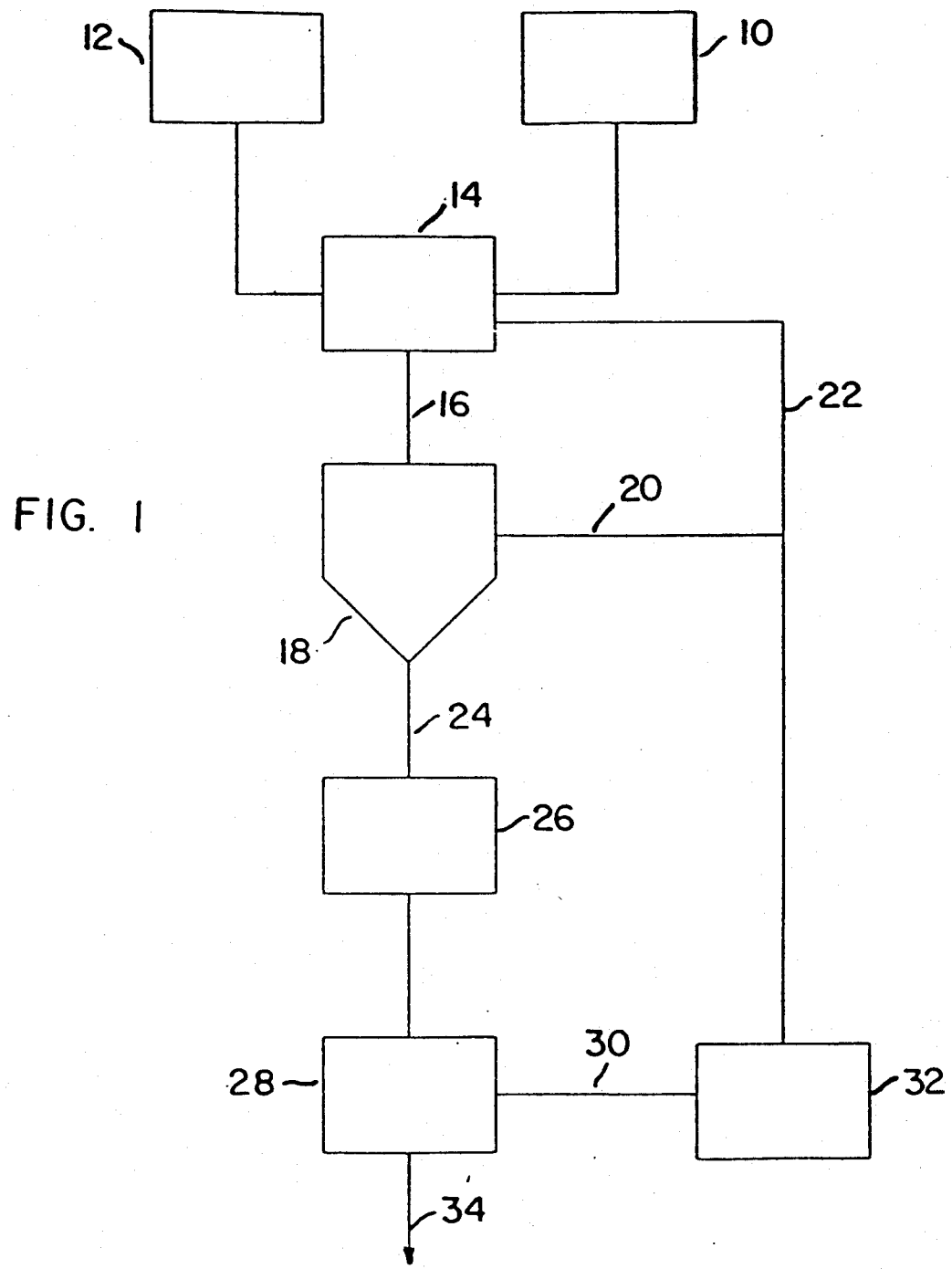

The molecular sieves suitably employed in the compositions of the present invention include any of the crystalline aluminosilicates well known in the art either as naturally occurring minerals or as synthetic species such as zeolite X, zeolite A, ZSM-5 or zeolite Omega. Preferably, however, the molecular sieves are hydrophobic crystalline siliceous molecular sieves in which at least about 90, and preferably at least 95, percent of the framework tetrahedral oxide units are $SiO_2$ tetrahedra and which have a sorptive capacity for water at 25° C. and 4.6 torr of less than about 10 weight percent, preferably less than about 6 weight percent. In the case of aluminosilicate molecular sieves, the framework $SiO_2/Al_2O_3$ molar ratio is at least 18 and is preferably at least 35. Molecular sieve zeolites having framework molar $Si/Al_2$ ratios of from 200 to 500 are particularly suitable. Many of the synthetic zeolites prepared using organic templating agents are readily produced in a highly siliceous form. In many instances the reaction mixtures can be essentially free of aluminum-containing reagents. These zeolites are markedly organophilic and include ZSM-5 (U.S. Pat. No. 3,702,886); ZSM-11 (U.S. Pat. No. 3,709,979); ZSM-35 (U.S. Pat. No. 4,016,245); ZSM-23 (U.S. Pat. No. 4,076,842); and ZSM-38 (U.S. Pat. No. 4,046,859) to name only a few. It has been found that the silica molecular sieves known as silicalite and F-silicalite are particularly suitable for use in the present invention and are thus preferred. These materials are disclosed in U.S. Pat. Nos. 4,061,724 and 4,073,865, respectively. To the extent the aforesaid siliceous sieves are synthesized to have $SiO_2/Al_2O_3$ ratios greater than 35, they are ordinarily suitable for use in the present compositions without any additional treatment to increase their degree of hydrophobicity. Molecular sieves which cannot be directly synthesized to have both sufficiently high Si/Al and/or degree of hydrophobicity ratios can be subjected to dealumination techniques, fluorine treatments and the like, which result in organophilic zeolite products. High-temperature steaming procedures for treating zeolite Y which result in hydrophobic product forms are reported by P. K. Maher et al, "Molecular Sieve Zeolites," Advan. Chem. Ser. 101, Americal Chemical Society, Washington, D.C., 1971, p. 266. A more recently reported procedure applicable to zeolite species generally involves dealumination and the substitution of silicon into the dealuminated lattice site. This process is disclosed in U.S. Pat. No. 4,503,023, issued Mar. 5, 1985 to Skeels et al. Halogen or halide compound treatments for zeolites to increase their hydrophobicity are disclosed in U.S. Pat. Nos. 4,569,833 and 4,297,335.

In the case of the aluminosilicates or silica polymorphs produced using large organic templating ions such as tetraalkylammonium ions, it is frequently necessary to remove charge balancing organic ions and any occluded templating material in order to facilitate their use in adsorption processes.

It should be pointed out that with respect to the hydrophobic aluminosilicates it is the framework $SiO_2/Al_2O_3$ ratio which is important. This is not necessarily the same ratio as would be indicated by conventional wet chemical analysis. Especially is this the case when dealumination has been accomplished by high temperature steaming treatments wherein aluminum-containing tetrahedral units of the zeolite are destroyed, but the aluminum values remain, at least in part, in the zeolite crystals. For such zeolite products resort must be had to other analytical methods such as X-ray and NMR. One such steam-treated zeolite Y composition, known in the art as LZ-10, has been found to be particularly useful in the compositions of the present process, especially when utilized in combination with the silica polymorph silicalite. The process for preparing LZ-10 is described in detail in U.S. Pat. No. 4,331,694 and in U.S. application Ser. No. 880,561, filed Feb. 23, 1978. When applied to the sequestration of organic odors, a benefit appears to be obtained by such a combination of molecular sieves in all proportions, but each type of adsorbent is preferably present in an amount of at least 10 percent based on the total weight of the two adsorbents (hydrated weight basis).

As synthesized the molecular sieve crystallites have, in general, sizes of about 1.5 to about 6.0 micrometers, but the crystallites are most frequently agglomerated into particles having sizes in the range of 10 to about 20 micrometers. Molecular sieve particles in this range, i.e., 1.5 to 20 micrometers, are all suitably utilized in forming the present compositions. It is preferred, however, that the particles are within the size range of 1.5 to 6.0 micrometers, or even more preferably within the range of 2 to 4 micrometers. If it is necessary to reduce the molecular sieve particle size, the grinding techniques well known in the art are suitably employed.

The silica binder is comprised of amorphous silica particles of colloidal dimensions. Such particles are readily available commercially in the form of silica sols, either aquasols or organosols. While the size of the colloidal silica particles is not narrowly critical, it is preferred that, in terms of nominal diameters, the particles are within the range of 5 nanometers up to 80 nanometers. Silica particles having nominal diameters within the preferred range of 5 to 20 nanometers, however, provide the additional benefit of increasing the sorptive capacity of the bonded agglomerates for molecular species having kinetic diameters calculated from their minimum equilibrium cross-sectional diameter of less than about 8 Angstroms. Such molecular species include many of the odor-causing organic substances of concern in odor elimination applications such as aliphatic amines, saturated or unsaturated aliphatic acids and aldehydes containing a single —COOH or —CHO group and the sulfur-containing compounds in which the valence of sulfur is less than 6. Triethylamine, isovaleric acid and methyl mercaptan are typical of compounds of these groups. The oxygen-adsorbing capacity of the preferred class of agglomerates is also increased, which may improve the effectiveness of the molecular sieve constituent of the agglomerates in suppressing odor.

The agglomerated adsorbent particles can consist of only the crystallites or particles of molecular sieve and the silica binder described above. In such agglomerates, the content of the molecular sieve constituent active in odor elimination is maximized. Unlike other binder materials, the colloidal sized amorphous silica particles of the present binder do not cause what is sometimes referred to as "binderblinding" of the molecular sieve. Binderblinding is in effect an interference by the binder with access by the intended adsorbate to the pore system of the molecular sieve. To some extent binderblinding can be alleviated by the inclusion in the bound agglomerate of particles of an inert diluent material with a particle size equal to or somewhat smaller than the adsorbent particles. The binder becomes attached preferentially to the diluent rather than to the molecular sieve particles. In effect, the diluent becomes the binder for the zeolite adsorbent. Though not necessary constituents in the case of the agglomerates of the present invention, inert diluents such as non-colloidal silicas, aluminas and clays can be included if desired, preferably in amounts less than about 40, preferably less than 30, weight percent of the overall agglomerate, anhydrous basis.

In preparing the agglomerates of this invention it is only necessary to combine the molecular sieve crystallites with the colloidal silica binder and any other optional and suitable constituents, form the resulting mixture into agglomerates of the desired size and configuration, and calcine the agglomerates at elevated temperatures, preferably in the range of 500° to 750° C., but in no event at a temperature high enough to destroy the crystal structure of the molecular sieve. According to the preferred procedure, the molecular sieve crystals are blended with a silica sol having colloidal suspended $SiO_2$ particles having nominal diameters of at least about 5 nanometers, preferably in the range of 5 to 20 nanometers, and containing from 16 to 40 weight percent silica. The dispersion medium for the sol can be either aqueous or organic. The processes for preparing such sols are well known in the art. Suitable sols are available commercially from several sources including Nalco Chemical Company, E. I. duPont de Nemours & Co. and Monsanto Chemical Company. The blended mixture is then dried to form agglomerates in the range of 40 to 800 micrometers.

With reference to the diagram of FIG. 1 of the drawings, the spray-dried agglomerates of this invention are prepared by metering an aqueous colloidal silica sol contained in holding tank 10 and molecular sieve adsorbent particles from bin 12 into a blending device, such as a Cowles mixer or dissolver 14. The thoroughly blended mixture from mixer 14 is fed to a spray dryer 18 through line 16 which produces a range of agglomerated particle sizes, the bulk of which are of the predetermined desired sizes. The two variables which have the greatest effect upon the particle size of spray-dried slurries are viscosity and flow rate to the spray nozzles. An increase in either or both of these parameters results in an increase in the average diameter of the product. The viscosity of the silica sol-zeolite blend fed to the spray drier can easily be increased by increasing the solids content of the blend, and is the preferred technique in forming the mini-beads of the present invention. An alternative, though not preferred, technique is to add a viscosity enhancer, such as carboxymethyl cellulose to the blend. The undersized particle (fines) are separated from the spray dried product, advantageously using a cyclone type separator, and recycled through lines 20 and 22 to the mixer 14. The remaining agglomerates are passed from the spray drier through line 24 to calcination means 26 wherein the calcination temperature can range from about 500° C. to 750° C., but is preferably about 650° C. The hardened and activated (dehydrated) particles are thereafter screened for size in screen 28 and the oversized agglomerates passed through line 30 to mill 32 wherein they are ground to particles of less than about 20 microns. The ground particles are recycled to blender 14 through line 22 and the agglomerates of proper size are collected as product and removed from the system through line 34.

The invention is illustrated by the following examples:

EXAMPLE 1

(a) Agglomerate compositions both within and without the scope of the present invention were prepared using as ingredients:
  (i) A silica polymorph known in the art as silicalite and having a bulk $Si/Al_2$ ratio of >130.
  (ii) a high silica form of zeolite Y (framework $Si/Al_2 > 17$) prepared by high temperature steam extraction of framework aluminum from the ammonium-exchanged form of the zeolite. The water adsorption capacity was <6 weight percent at 25° C. and 4.6 torr water vapor pressure.
  (iii) a basic (ammonium ion stabilized) aqueous silica sol sold under the tradename Nalco 2326 (Nalco Chemical Co.) containing 16 weight percent $SiO_2$ and having nominally spherical silica particles with diameters of about 5 nanometers;
  (iv) an acid stabilized aqueous sol commercially available under the tradename Nalco 1034A containing 34 weight percent $SiO_2$ and having nominally spherical silica particles with diameters of about 20 nanometers.
  (v) an ammonium ion stabilized aqueous silica sol available commercially from E. I. duPont under the tradename Ludox AS-40. This sol contains 40 weight percent $SiO_2$ and contains silica particles about 20 nanometers in diameter.
  (vi) a solid amorphous precipitated silica commercially available under the tradename "HiSil" having a nitrogen surface area of 150 $m^2/g$ and average agglomerate size of about 8 microns.
  (vii) a kaolin type clay sold under the tradename "Altowhite" by the Georgia Kaolin Company.
  (viii) an haloysite-type mineral clay generally known as New Zealand China clay (NZCC).

The HiSil, NZCC and Altowhite materials were employed as diluents or fillers. The N2326, N1034A and AS-40 silica sols were utilized as binder precursers. Mixtures of the silicalite and the high-silica form of zeolite Y were the molecular sieve constituent of some of the agglomerate products, and in others the zeolite Y material was used alone as the molecular sieve constituent. Hereinafter, the mixture of silicalite and high silica Y is identified as "S/Y" and the high silica Y alone is identified as "Y."

In preparing the agglomerates, the well-blended mixtures of ingredients were spray dried and calcined in air at 650° C. The products were variously analyzed for oxygen capacity, attrition resistance and triethylamine adsorption capacity.

The particulars concerning the chemical composition of the agglomerates and their properties are set forth in Table I, below.

TABLE I

| Molecular Sieve | | Silica Sol Binder | | Filler | | Agglomerate Particle | Agglomerate Oxygen |
|---|---|---|---|---|---|---|---|
| Type | Wt. % | Type | Wt. % | Type | Wt. % | Size Range, Micrometers | Capacity, Wt. % |
| S/Y | 75 | N2326 | 15 | HiSil | 10 | 250 × 600 | 18.05 |
| S/Y | 75 | N2326 | 10 | HiSil | 10 | 150 × 250 | 18.04 |
| S/Y | 85 | N2326 | 15 | None | — | 250 × 600 | — |
| Y | 85 | N1034A | 15 | None | — | 250 × 600 | — |
| S/Y | 80 | N2326 | 20 | None | — | 250 × 600 | 18.89 |
| S/Y | 80 | N2326 | 20 | None | — | 250 × 600 | 18.57 |
| S/Y | 50 | N2326 | 20 | HiSil | 30 | 250 × 600 | 13.93 |
| Y | 80 | AS-40 | 20 | None | — | — | 19.05 |
| Y | 80 | AS-40 | 20 | None | — | — | 18.57 |
| S/Y | 50 | N2326 | 20 | Altowht. | 30 | — | 12.69 |
| S/Y | 60 | N2326 | 20 | Altowht. | 20 | — | 14.79 |
| S/Y | 50 | N2326 | 20 | NZCC | 30 | — | 12.75 |

EXAMPLE 2

(a) The unique aspect of the colloidal silica bonded agglomerates in which the adsorption of oxygen and odor-causing organics exceeds their expected capacities in this regard, is demonstrated by the following experimental procedures: Five agglomerated products were prepared by spray drying and calcining at 650° C. the blended mixtures whose compositions are set forth in tabular form below:

TABLE II

| Ingredient | Sample A | Sample B | Sample C | Sample D | Sample E |
|---|---|---|---|---|---|
| S/Y, wt. % | 75 | 80 | 50 | 50 | 60 |
| N2326 | 15 | 20 | 20 | 20 | 20 |
| HiSil | 10 | — | 30 | — | — |
| Altowhite | — | — | — | 30 | 20 |

Figure 2:
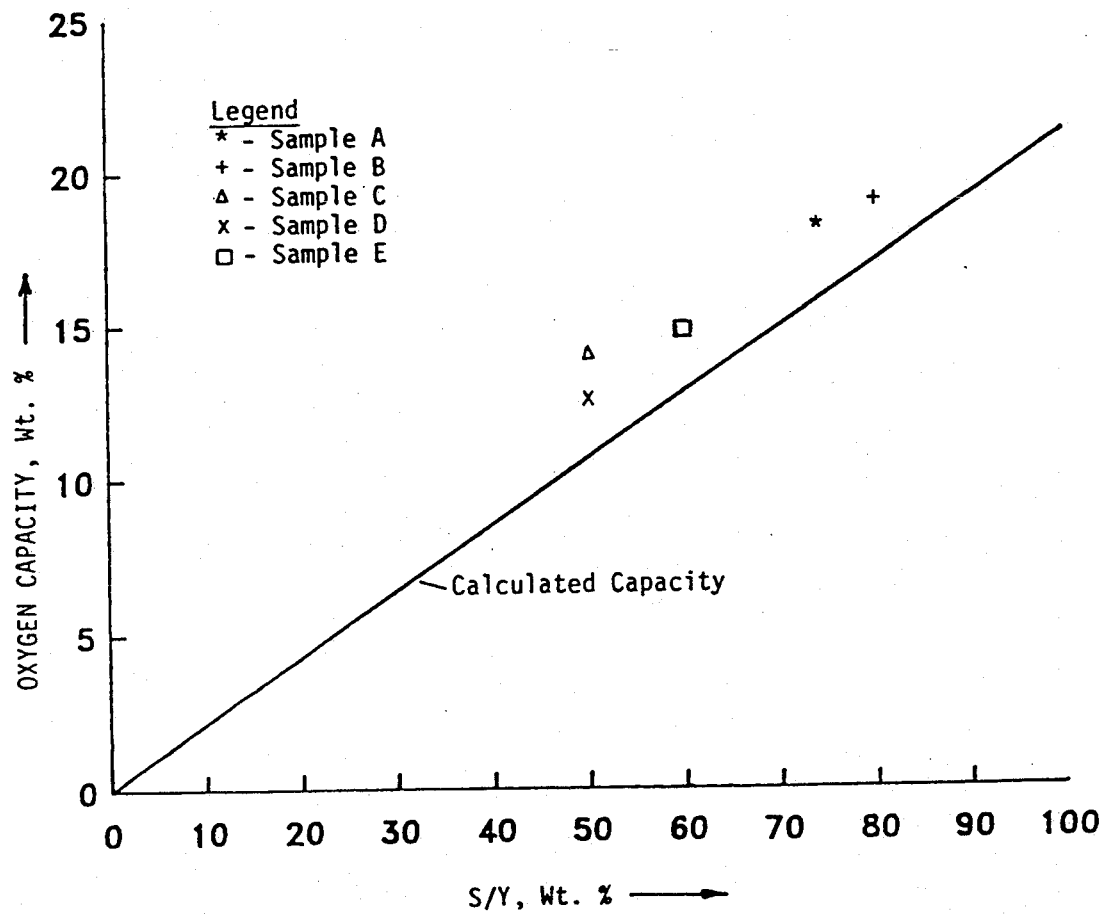

The S/Y mixture of molecular sieves alone was determined to have an adsorption capacity for oxygen at −183° C. and 100 torr oxygen pressure of 21.3 weight percent. Both the HiSil and the Altowhite filler materials have essentially nil capacity for oxygen under the same conditions. Thus, Sample A would be expected to adsorb 75% of the amount of oxygen adsorbed by an equal weight of pure S/Y molecular sieve constituent. Similarly, Sample B should adsorb 80% as much, samples C and D 50% as much and Sample E 60% as much oxygen as pure S/Y. It was found, however, that the samples all adsorbed more than the expected amounts of oxygen, the surplus being attributable to the N2326 colloidal silica binder. The values for the oxygen capacities of the sample at −183° C. and 100 torr oxygen pressure are shown graphically in FIG. 2 of the drawings. It appears that the silica sol N2326 upon drying develops a pore system in which the pores have diameters of about 9 Angstroms. This value is calculated based on the assumption that the pores are cylindrical and monodispersed and that the micropore volume of the N2326 is 0.079 cc/g. and using the equation $$d = 4V/SA$$

wherein "V" is the micropore volume of the solid in terms of m³/g and "SA" is the BET surface area in terms of m²/g (342 m²/g for the N2326). In view of the size of the colloidal silica particle, 50 Angstroms, and their generally spherical configuration the cylinder circumscribed by the close packed spheres is approximately 0.16 times the diameter of the spheres, or about 8 Angstroms, a value in good agreement with the pore diameter calculated above using the micropore volume and the surface area.

(b) The micropore system developed in the binder by the colloidal-size silica particles is also found to adsorb triethylamine quite strongly, thus adding to the effectiveness of the siliceous molecular sieve agglomerate constituent in odor elimination. Samples of silica bonded agglomerates of this invention, the unbonded molecular sieve constituent and the silica binder alone were tested for adsorptive capacity for triethylamine (TEA) under various conditions of TEA partial pressure and using the adsorbents in both the hydrated and anhydrous states. The adsorbents tested were as follows:

Sample A: A silica-bonded S/Y agglomerate containing 80 weight percent molecular sieve, 0 weight percent HiSil filler and 20 weight percent colloidal silica binder. The silica binder was derived from the commercially available silica sol obtained from Nalco Chemical Company under the tradename Nalco 2326. The S/Y molecular sieve composition was a mixture of the same silicalite and the steam-treated form of zeolite Y as used in Example 1 above.

Sample B: The same S/Y agglomerate composition of Sample A except when tested the agglomerate contained 20 weight percent water.

Sample C: A pure sample of the Nalco 2326 silica binder used in the preparation of Sample A which had been calcined at 650° C. for 1 hour.

Sample D: The same Nalco 2326 composition as Sample C except immediately prior to testing the sample was allowed to become hydrated to the extent that it contained 20 weight percent water.

Sample E: A sample of the same S/Y molecular sieve mixture used in the preparation of Sample A.

The TEA adsorption isotherms at 35° C. for the various compositions are set forth in tabular form below:

TABLE III

| Sample No. | TEA Partial Pressure P/Po at °C. | Wt % TEA Adsorbed |
|---|---|---|
| A | 0.12 | 9.5 |
| A | 0.1 × 10⁻² | 7.2 |
| B | 0.1 × 10⁻¹ | 7.2 |
| B | 0.27 | 8.8 |
| C | 0.1 × 10⁻² | 7.2 |
| C | 0.04 | 10.0 |
| D | 0.12 | 6.5 |
| D | 0.58 | 7.0 |
| E | 0.65 | 11.0 |
| E | 0.1 × 10⁻² | 5.8 |
| E | 0.4 | 9.0 |
| E | 0.28 | 7.5 |

It is readily apparent from the data of Table III that upon hydration the adsorption capacities of both the silica binder composition and hence the agglomerates of the present invention decrease compared with their respective anhydrous forms. As expected from the known characteristics of the molecular sieve constituents, the decrease in TEA capacity for the binder alone was greater than for the bonded molecular sieve agglomerates, but the capacity for TEA of the bonded agglomerate remains higher after hydration than the calculated capacity based solely on the zeolite content.

To limit the adverse effect upon adsorption characteristics resulting from hydration of the silica binder material, the surface of the silica particles can be treated to remove at least a portion of the terminal hydroxyl groups bonded to surface silicon atoms. Such treatments, using procedures well known in the art, can be either thermal or chemical. The thermal treatment comprises simply calcining the silica bonded agglomerate at temperatures in the range of 300° C. to 800° C. for periods of from about $3 \times 10^{-4}$ to 2 hours in dry air to dehydroxylate the surface of the silica particles which form the binder without thermally destroying the crystal structure of the bonded siliceous molecular sieve particles. It will be understood by those skilled in the art that the calcination time and temperature are interdependent, the higher temperatures requiring the least time to accomplish dehydroxylation.

Several chemical treatments are known in which the surface silanol groups are converted to other groups, such as methoxy or siloxy groups, which inhibit the adsorption of water on the silica surface. Other methods involve the "screening" of silanol groups by coating the silica particles with polymer such as a polysiloxane. In the methoxylation procedure the silica particles can simply be heated at an appropriate temperature and time in a methanol vapor until the degree of methoxylation has occurred. For complete methoxylation it is necessary to treat the silica particle several times with methanol vapor since water formed from the reaction of the methanol with the silanol groups of the silica causes some hydrolysis of the $\equiv$Si—OH groups previously formed. It has also been proposed by M. J. D. Low et al, *Journal of Catalysis,* 44, 300–305 (1976), to methoxylate silica with other methoxy-containing compounds of which trimethoxymethane (TMM) was the most efficient. TMM reacts readily and completely removes surface silanols in the relatively short time of less than 20 minutes at a temperature in the range of 300°–400° C. at TMM pressures of 10 to 30 torr. Low et al have also reported successful dehydroxylation of silica surfaces by reaction with trichlorosilane at 350° C. See *Journal of Catalysis,* 54, 219–222 (1978), in this regard. Other reactive silanes include alkyl, aryl (especially phenyl) and aralkyl halosilanes and silazanes. These reactants employed to accomplish silanization include dimethyl monochlorosilane, dimethyl dichlorosilane, hexamethyl disilazane and trichlorooctadecylsilane. Treatments of silicas involving these silanes are disclosed in U.S. Pat. No. 4,954,532, issued Sep. 4, 1990, to T. J. Elliott et al. In the Elliott et al patent it is also disclosed to polymerize a suitable siloxane monomer in the presence of the silica particles thereby coating the particles with a polysiloxane to render the particles hydrophobic. Suitable siloxane monomers for this purpose include methyl hydrogen polysiloxane and alkyl, aryl and aralkyl cyclotetrasiloxanes, especially octamethylcyclotetrasiloxane. Polymerization can readily be accomplished by heating.

What is claimed is:

1. Molecular sieve agglomerates having nominal diameters within the range of 40 to 800 micrometers comprising on an anhydrous basis from about 50 to about 90 weight percent of zeolite molecular sieve particles having sizes within the range of about 1.5 to about 20 micrometers and from about 10 to about 20 weight percent of a bonding agent consisting essentially of particles of amorphous silica having nominal diameters in the range of 5 to 20 nanometers.

2. Molecular sieve agglomerates according to claim 1 wherein at least some of the zeolitic molecular sieve particles are of zeolites having framework $SiO_2/Al_2O_3$ molar ratios in excess of 18, and the agglomerates have nominal diameters in the range of 100 to 600 micrometers.

3. Molecular sieve agglomerates according to claim 2 wherein at least some of the zeolitic molecular sieve particles have framework $SiO_2/Al_2O_3$ molar ratios in excess of 35 and have particle sizes in the range of about 1.5 to 6 micrometers.

4. Molecular sieve agglomerates according to claim 1 wherein the surface of the silica particles of the bonding agent has been treated to reduce the number of surface silanol groups initially present.

5. Molecular sieve agglomerates according to claim 2 wherein the surface of the silica particles of the bonding agent has been treated to reduce the number of surface silanol groups initially present.

6. Molecular sieve agglomerates according to claim 5 wherein the reduction of the silanol groups on the surface of the silica particles of the bonding agent is accomplished by methoxylation.

7. Molecular sieve agglomerates according to claim 5 wherein the reduction of the silanol groups on the surface of the silica particles of the bonding agent is accomplished by silanization.

8. Process for preparing the silica-bonded agglomerates of claim 1 wherein he zeolite molecular sieve particles are blended with a silica sol and the agglomerates are formed into spherical or spheroidal shapes by spray drying.

9. Molecular sieve absorbent agglomerates suitable for use in odor control, said agglomerates having nominal diameters within the range of 40 to 800 micrometers and being comprised, on an anhydrous basis, of (a) from about 50 to about 90 weight percent particles of zeolitic molecular sieves having framework $SiO_2/Al_2O_3$ molar ratios in excess of 18, said particles having sizes within the range of about 1.5 to about 20 micrometers and (b) from about 10 to about 20 weight percent of a bonding agent consisting essentially of particles of amorphous silica having nominal diameters in the range of 5 to 80 nanometers and which have been treated to reduce the number of surface silanol groups initially present.

* * * * *